United States Patent [19]

Hicks

[11] 4,114,425
[45] Sep. 19, 1978

[54] OIL COOLER TESTER

[76] Inventor: Albert Edward Hicks, 10 Whitman Ct., San Carlos, Calif. 94070

[21] Appl. No.: 820,185

[22] Filed: Jul. 29, 1977

[51] Int. Cl.² .......................................... G01M 3/32
[52] U.S. Cl. ...................................... 73/40; 73/49.7
[58] Field of Search ............... 73/40, 49.2, 49.7, 49.8, 73/37

[56] References Cited

U.S. PATENT DOCUMENTS

| | | | |
|---|---|---|---|
| 3,546,923 | 12/1970 | Fletcher et al. | 73/40 |
| 3,593,567 | 7/1971 | Hartley | 73/40 |
| 3,786,671 | 1/1974 | Caron | 73/40 |
| 3,807,219 | 4/1974 | Wallskog | 73/40 |
| 3,813,922 | 6/1974 | Oswald et al. | 73/49.2 |
| 3,822,585 | 7/1974 | Toback | 73/49.2 |

Primary Examiner—Richard C. Queisser
Assistant Examiner—Joseph W. Roskos
Attorney, Agent, or Firm—Townsend and Townsend

[57] ABSTRACT

Test apparatus for the oil cooler from a Volkswagen ® automobile including a support having apertures and studs compatible with the mounting studs and apertures of a Volkswagen ® oil cooler. The support has an air chamber with two ports communicating with the ambient atmosphere located to sealingly engage with the inlet and outlet ports of a Volkswagen ® oil cooler when the oil cooler is mounted on the support. A pressure gauge is connected to the air chamber, and a one-way air entry conduit is also connected to the air chamber. When the oil cooler is installed on the support air under pressure is applied to the air entry conduit which fills the air chamber together with the oil cooler. When the pressure remains constant it indicates that there is no leak in the oil cooler. Conversely, a pressure drop indicates a leak in the oil cooler.

6 Claims, 2 Drawing Figures

OIL COOLER TESTER

This invention relates to test apparatus for oil coolers. More particularly, it relates to apparatus for testing oil coolers of the type used on Volkswagens ® by introducing air under pressure to the cooler and monitoring the air on a pressure gauge.

Heretofore when Volkswagen ® automobiles have exhibited oil leaks in the vicinity of the oil cooler the cooler has been removed and new gaskets inserted at the situs of the inlet and outlet lines in the cooler housing. In past experience faulty gaskets have been found to be the primary cause of leakage and replacement of them frequently stops the leak. However, in the past the only way to determine if such was infact the case was to re-install the old oil cooler with the new seals and observe whether or not the leak had been fixed. In those instances where a leak was still observed substantial labor would be involved in again removing the oil cooler and replacing it with a new one. The alternative was to replace all oil coolers when installing new gaskets. This alternative was inefficient in that many perfectly servicable oil coolers would be replaced unnecessarily. The present invention is designed to test and determine whether the oil cooler itself needs replacing before re-installing it when replacing the gaskets.

In accordance with the preferred embodiment the present invention provides test apparatus for the oil cooler from a Volkswagen ® automobile including a support having apertures and studs compatible with the mounting studs and apertures of a Volkswagen ® oil cooler; said support having an air chamber with two ports communicating with the ambient atmosphere located to sealingly engage with the inlet and outlet ports of a Volkswagen ® oil cooler when the oil cooler is mounted on said support; a pressure gauge connected to said air chamber; and a one-way air entry conduit connected to said air chamber.

With respect to the accompanying drawings.

Figure 1:
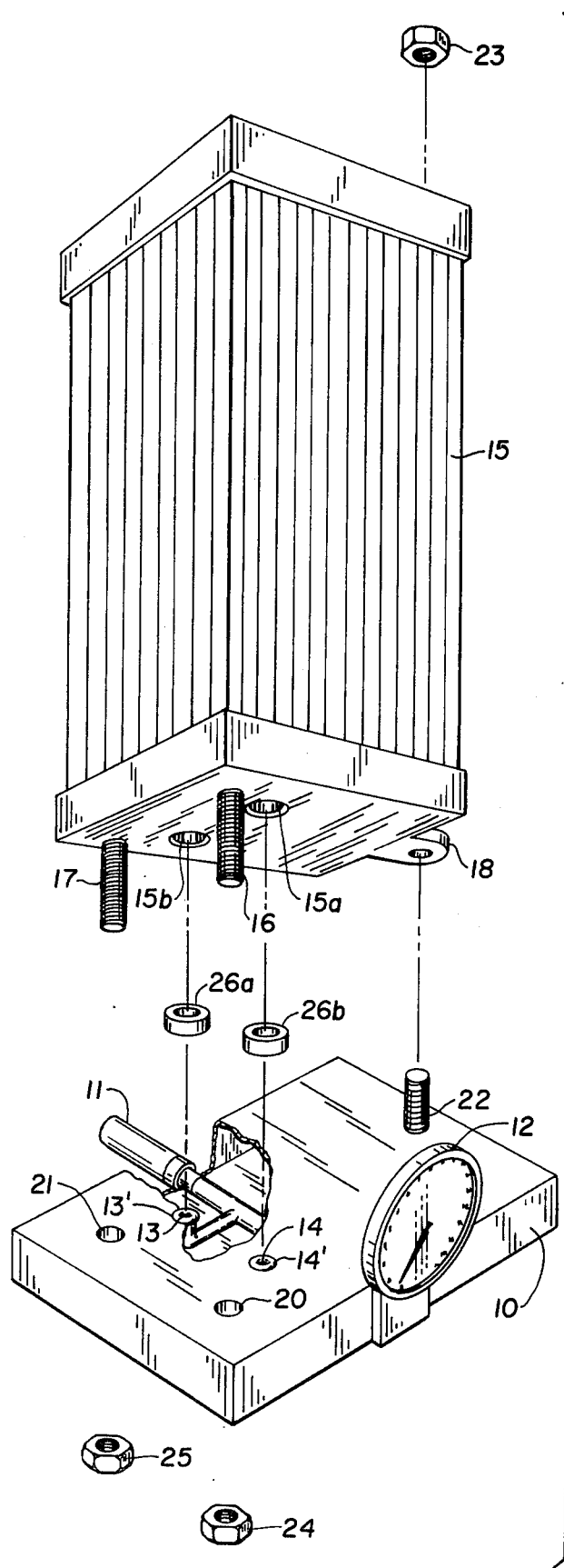
FIG. 1 is an exploded perspective showing the present testing apparatus with parts broken away and a typical oil cooler for testing by the apparatus.

With respect to the drawings, the present apparatus includes a housing or block 10 with a fluid conduit or chamber therein. Fluid conduit 11, which will usually be used in connection with a source of air under pressure (not shown), communicates simultaneously with pressure gauge 12 and ports 13 and 14. Annular resilient gaskets or seals 13' or 14' are disposed about each of ports 13 and 14 respectively. In the preferred embodiment conduit 11 includes a check valve (not shown) at the input end of conduit 11 which permits air to be forced into conduit 11 while preventing escape back through the entrance to conduit 11.

A typical oil cooler 15 conventionally found on air cooled automobiles such as a Volkswagen ® includes oil inlet port 15a and oil outlet port 15b for circulation of oil through the cooling fins of cooler 15. Extending downwardly from cooler 15 are threaded studs 16 and 17. On the opposite side of oil cooler 15 as may best be seen in FIG. 2 an apertured attaching ear 18 extends laterally outwardly from oil cooler 15.

Figure 2:
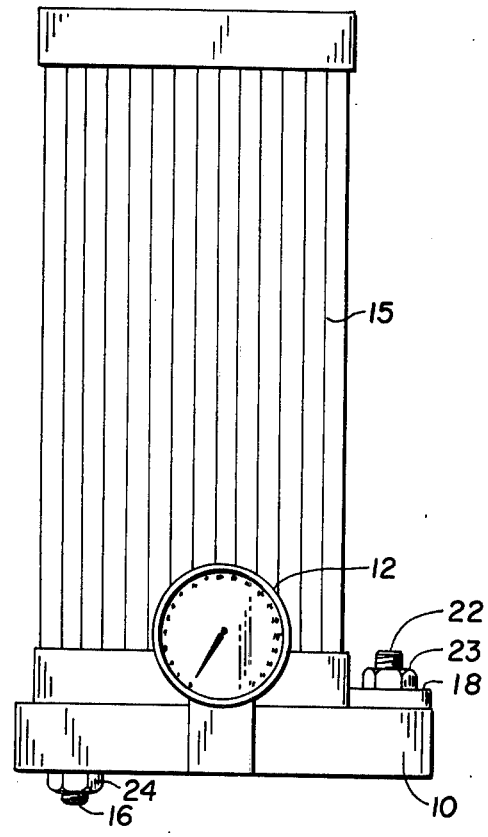
FIG. 2 is a side elevation showing an oil cooler in place on the present test apparatus in position for being tested for leaks.

To mount and test cooler 15 block or housing 10 additionally includes holes 20 and 21 therethrough for receiving threaded studs 16 and 17 respectively. Block 10 is thin enough so that holes 20 and 21 receive studs 16 and 17 with their terminal portions emerging from the bottom side of block 10 as may be seen in FIG. 2. Block 10 also includes threaded stud 22 mounted thereon. Holes 20 and 21 and stud 22 are positioned to cooperatively receive oil cooler studs 16 and 17 and mounting ear 18 as shown in FIG. 2. Additionally, ports 13 and 14 are spaced to cooperatively sealably engage with oil cooler inlet and outlet ports 15a and 15b with round rubber seals 26a and 26b (conventionally found supplied with Volkswagen ® oil coolers) therebetween (see FIG. 1) when the oil cooler is installed on the test apparatus as shown in FIG. 2.

When the oil cooler is installed for testing, nut 23 is tightened on stud 22 and nuts 24 and 25 are on cooler studs 16 and 17 respectively. When nuts 23, 24 and 25 are tightened an air-tight seal is obtained between oil cooler inlet and outlet ports 15a and 15b and test ports 13 and 14.

To determine if any leaks are present in oil cooler 15 air under pressure is inserted in conduit 11 to a preselected pressure level which will be shown on pressure gauge 12. If the pressure remains constant there are no leaks in oil cooler 15. If the pressure decreases a leak in oil cooler 15 is indicated.

I claim:

1. A device for testing for leakage in an oil cooler having oil inlet and outlet ports comprising: a block defining a fluid conduit therein; pressure measuring means connected to said conduit; said conduit having an entrance for introducing pressurized fluid; first and second ports on said block in fluid communication with said conduit; said first and second ports being spaced apart relative to the inlet and outlet ports of the oil cooler to be tested for sealable engagement therewith; and means on said block for removably attaching an oil cooler in sealed engagement between its oil inlet and outlet ports and said first and second ports.

2. A device for testing for leakage in accordance with claim 1 and including a check valve in said entrance for introducing pressurized fluid.

3. A device for testing for leakage in accordance with claim 1 and including resilient annular seals about said first and second ports to promote sealed engagement with the inlet and outlet ports of the oil cooler being tested.

4. A device for testing for leakage in accordance with claim 1 wherein said means on said block for removably attaching the oil cooler comprises apertures through said block for receiving therethrough threaded studs of the oil cooler being tested, said apertures being of a length which permits the oil cooler studs to pass through the aperture and out the opposite side for receiving nuts thereon.

5. A device for testing for leakage in accordance with claim 4 wherein said means on the block for removably attaching the oil cooler further includes a threaded stud mounted on the block positioned to pass through a mounting ear on the oil cooler whereby placement of a nut on the stud locks the oil cooler to the block.

6. Test apparatus for the oil cooler from an air cooled automobile including a support having apertures and studs compatible with the mounting studs and apertures of an air cooled oil cooler; said support having an air chamber with two ports communicating with the ambient atmosphere located to sealingly engage with the inlet and outlet ports of an air cooled oil cooler when the oil cooler is mounted on said support; a pressure gauge connected to said air chamber; and a one-way air entry conduit connected to said air chamber.

* * * * *